United States Patent
Kim et al.

(10) Patent No.: US 8,040,630 B2
(45) Date of Patent: Oct. 18, 2011

(54) METHOD AND APPARATUS FOR ESTIMATING TOUCHDOWN OF A SLIDER IN A HARD DISK DRIVE

(75) Inventors: Dongman Kim, Campbell, CA (US); Sang Hoon Chu, San Jose, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 12/463,340

(22) Filed: May 8, 2009

(65) Prior Publication Data

US 2010/0284109 A1     Nov. 11, 2010

(51) Int. Cl.
G11B 21/02     (2006.01)
G11B 27/36     (2006.01)
(52) U.S. Cl. ............................................. 360/75; 360/31
(58) Field of Classification Search .................. None
See application file for complete search history.

(56) References Cited

U.S. PATENT DOCUMENTS 7,477,470 B2 *   1/2009   Leis et al. ..................... 360/75
7,605,996 B2 *   10/2009  Baumgart et al. ............. 360/75

* cited by examiner

Primary Examiner — Andrew L Sniezek

(57) ABSTRACT

A hard disk drive using an increase in servo address mark delays to create a touchdown flag in response to a slider making contact with a rotating disk surface while accessing a track. This may be used particularly when the track being accessed is located away from the Inside Diameter (ID). The hard disk drive may further use resistive heater electrical readings to determine the touchdown flag for track locations near the ID. The hard disk drive may be calibrated during manufacture and/or may be recalibrated in the field with this method. The calibrated hard disk drive is a product of this method. The method may be used during normal access operations and/or may be embodied as a program system residing in computer readable memory for instructing a computer operating the hard disk drive, where the computer and/or the memory may or may not be included in the hard disk drive.

7 Claims, 5 Drawing Sheets

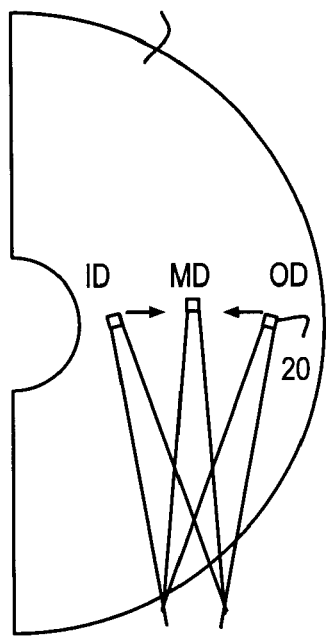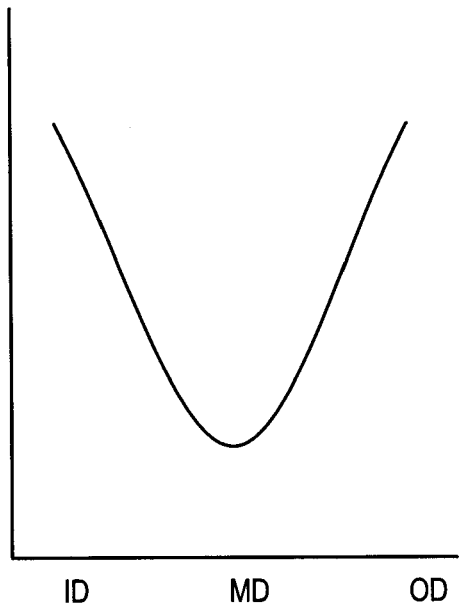
Fig. 6A
Fig. 6B
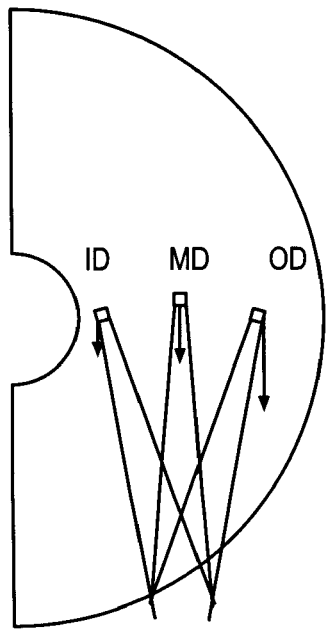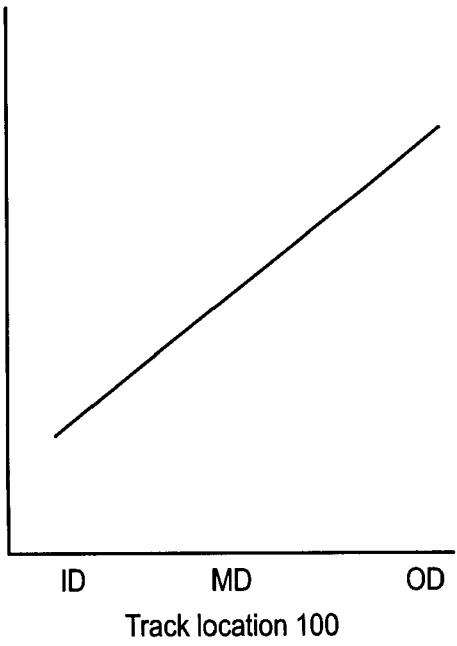
Fig. 7A
Fig. 7B

METHOD AND APPARATUS FOR ESTIMATING TOUCHDOWN OF A SLIDER IN A HARD DISK DRIVE

TECHNICAL FIELD

This invention relates to the estimation of when a slider lands or touches down on a rotating disk surface in a hard disk drive.

BACKGROUND OF THE INVENTION

The basic mechanics of a hard disk drive involve at least one disk being rotated to create a rotating disk surface and the position of a slider over the rotating disk surface to access data that is usually stored as a track. One of the central and continuing concerns is determining when and under what conditions the slider make contact with the rotating disk surface. As hard disk drives evolve, the flying height of the slider over the rotating disk surface becomes smaller. Today the flying height during the access of a track is often less than ten nanometers (nm) and the tolerances for flying height as measured in standard deviations may be from three to six nm. While several methods have been proposed and developed, several approaches are relatively insensitive to a region of the disk surface referred to as the Middle Diameter (MD) and/or suffer from low sampling bandwidth problems.

SUMMARY OF THE INVENTION

Embodiments of the invention include a hard disk drive using an increase in servo address mark delays to create a touchdown flag in response to a slider making contact with a rotating disk surface while accessing a track. This method is sensitive at the Middle Diameter (MD) as well as having a much high sampling bandwidth than other methods based upon the friction of the slider contacting the rotating disk surface, because the servo address mark may be detected in every sector of the track. This approach may be used particularly when the track being accessed is located away from the Inside Diameter (ID). An electrical reading of a resistive heater embedded in the head may further be used to determine the touchdown flag for track locations near the ID.

The hard disk drive may be calibrated during manufacture and/or may be recalibrated in the field with this method. The calibrated hard disk drive is a product of this method. The method may be used during normal access operations and/or may be embodied as a program system residing in computer readable memory for instructing a computer operating the hard disk drive, where the computer and/or the memory may or may not be included in the hard disk drive.

BRIEF DESCRIPTION OF THE DRAWINGS

FIG. 6A shows a schematic of the bias force shown as arrows exerted due to the slider contacting the rotating disk surface and FIG. 6B shows the relative strength of the bias force measured by resistive heater electrical as the vertical axis acting on the slider when it contacts the rotating disk surface at a track location shown in the horizontal axis. The bias force will be toward the Middle Diameter (MD), which means that there is essentially no bias force generated when the slider contacts the rotating disk surface near the Middle Diameter, whereas there is a measurable amount of bias force acting on the slider farther from the MD. The resistive heater may be used to measure this bias force, leading to readings similar to those shown in FIG. 6B.

FIG. 7A shows a schematic of the friction on the slider contacting the rotating disk surface shown as arrows and FIG. 7B shows the relative strength of the friction measured by the servo address mark delay as the vertical axis acting on the slider when it contacts the rotating disk surface at a track location shown in the horizontal axis. The bias force will be directed away from the direction of motion and will be experienced as torque, which means that the torque will be minimal at the Inside Diameter (ID) and maximal at the Outside Diameter. Previous approaches to measuring this torque used readings of the spindle current, which had several problems, most importantly being the relatively low bandwidth resulting from needing to take at least three readings over the time it takes for three revolutions. By measuring the delay in the servo address mark for each sector in a track, this approach is as much faster as there are sectors in a track. For example a track with 240 sectors would have a bandwidth 240 times greater than the approach measuring the spindle current.

DETAILED DESCRIPTION

This invention relates to estimation of contact between a slider and a rotating disk surface in a hard disk drive. Embodiments of the invention include a hard disk drive using an increase in servo address mark delays to create a touchdown flag in response to a slider making contact with a rotating disk surface while accessing a track. This method is sensitive at the Middle Diameter (MD) as well as having a much high sampling bandwidth than other methods based upon the friction of the slider contacting the rotating disk surface, because the servo address mark may be detected in every sector of the track. This approach may be used particularly when the track being accessed is located away from the Inside Diameter (ID). The hard disk drive may further use resistive heater electrical readings to determine the touchdown flag for track locations near the ID.

The hard disk drive may be calibrated during manufacture and/or may be recalibrated in the field with this method. The calibrated hard disk drive is a product of this method. The method may be used during normal access operations and/or may be embodied as a program system residing in computer readable memory for instructing a computer operating the hard disk drive, where the computer and/or the memory may or may not be included in the hard disk drive.

Figure 1:
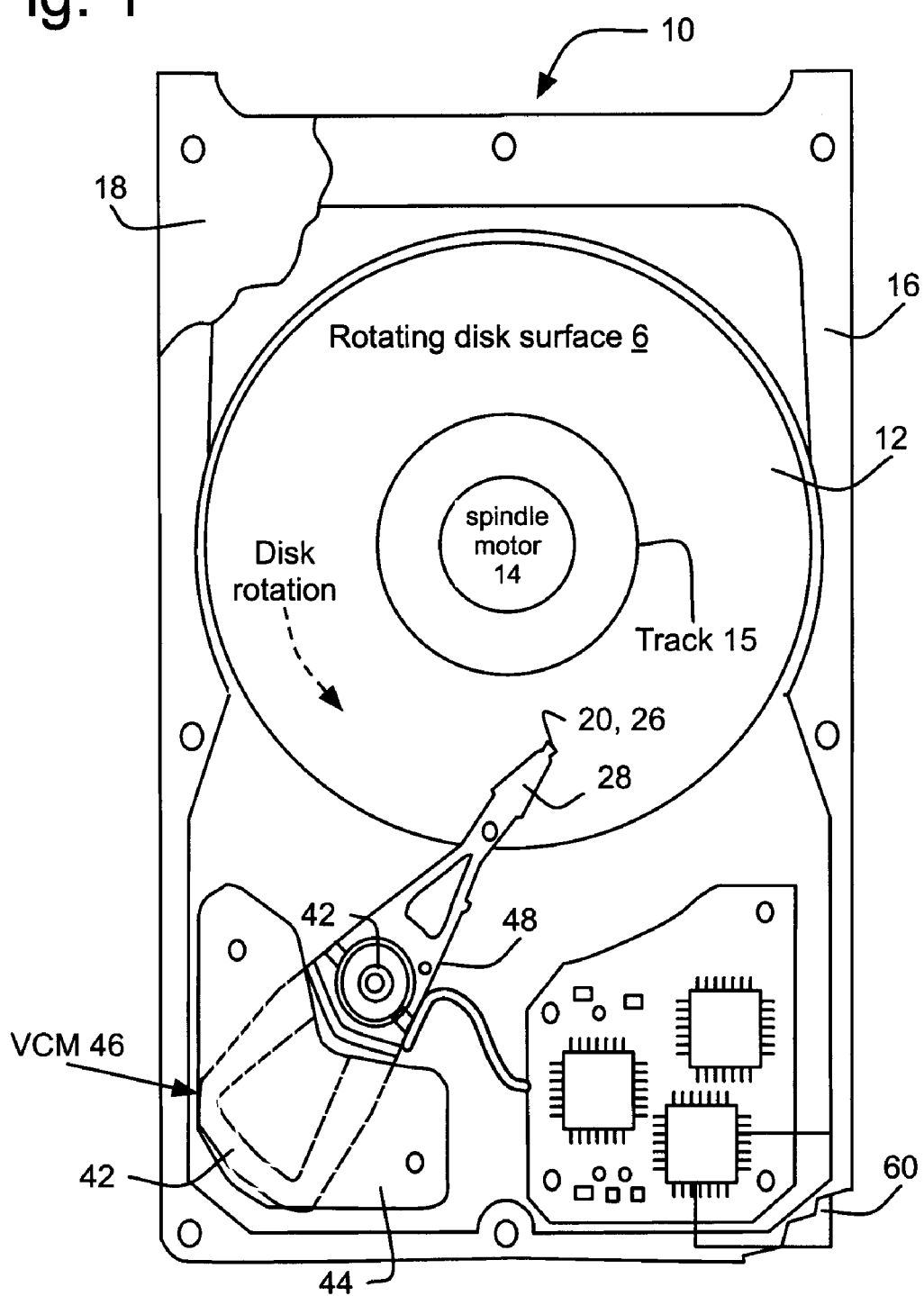
FIG. 1 shows an example of an embodiment of the invention as a hard disk drive including a disk base to which a spindle motor is mounted with at least one disk coupled to the spindle motor to create a rotating disk surface. A voice coil motor includes a head stack assembly pivotably mounted by an actuator pivot to the disk base, responsive to its voice coil interacting with a fixed magnetic assembly mounted on the disk to position at least one slider to access data stored on the rotating disk surface. The hard disk drive includes a circuit board also mounted on the disk base opposite the spindle motor and the voice coil motor that may be used to estimate the flying height and control the spindle motor, the voice coil motor and/or the slider.

Referring to the drawings more particularly by reference numbers, FIG. 1 shows an example of an embodiment of the invention as a hard disk drive 10 including a disk base 16 to which a spindle motor 14 is mounted with at least one disk 12 coupled to the spindle motor to create a rotating disk surface 6. A voice coil motor 46 includes a head stack assembly 48 pivotably mounted by an actuator pivot 40 to the disk base, responsive to its voice coil 42 interacting with a fixed magnetic assembly 44 mounted on the disk base to pivot a head gimbal assembly 26 position at least one slider 20 to access data stored on a track 15 the rotating disk surface. The hard disk drive includes a circuit board 60 also mounted on the disk base opposite the spindle motor and the voice coil motor that may be used to estimate the flying height and control the spindle motor, the voice coil motor and/or the slider. A disk cover 18 is mounted on the disk base to encapsulate all the shown components except the circuit board.

The hard disk drive 10 may access the data 15 arranged in tracks on the rotating disk surface 6 by controlling the spindle motor 14 to rotate the disks 12 at a specific rate. The data may be organized as tracks that may be configured as concentric circles or as a tightly packed spiral. The voice coil motor 46 operates by stimulating the voice coil 42 with a time varying electrical signal to magnetically interact with the fixed magnet assembly 34 causing the head stack assembly to pivot about the actuator pivot 40 moving the head gimbal assembly 28 to position the slider 20 near the track on the rotating disk surface. In many embodiments, a micro-actuator assembly preferably coupled to the slider may be further stimulated to further control the position of the slider. A resistive heater 24 either in the micro-actuator assembly, or preferably in the slider, may be stimulated to alter the flying height of the slider over the rotating disk surface.

Figure 2B:
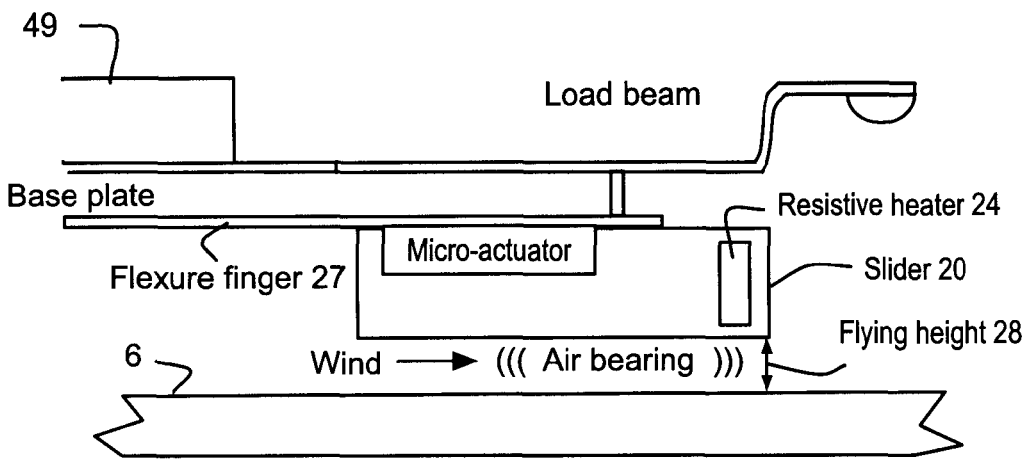
FIG. 2B shows a side view of some details of the head gimbal assembly of the previous Figures, in particular, showing the flying height of the slider over the rotating disk surface and a resistive heater used to refine the slider's positioning above the track as well as determine when the slider contacts the rotating disk surface.
Figure 2A:
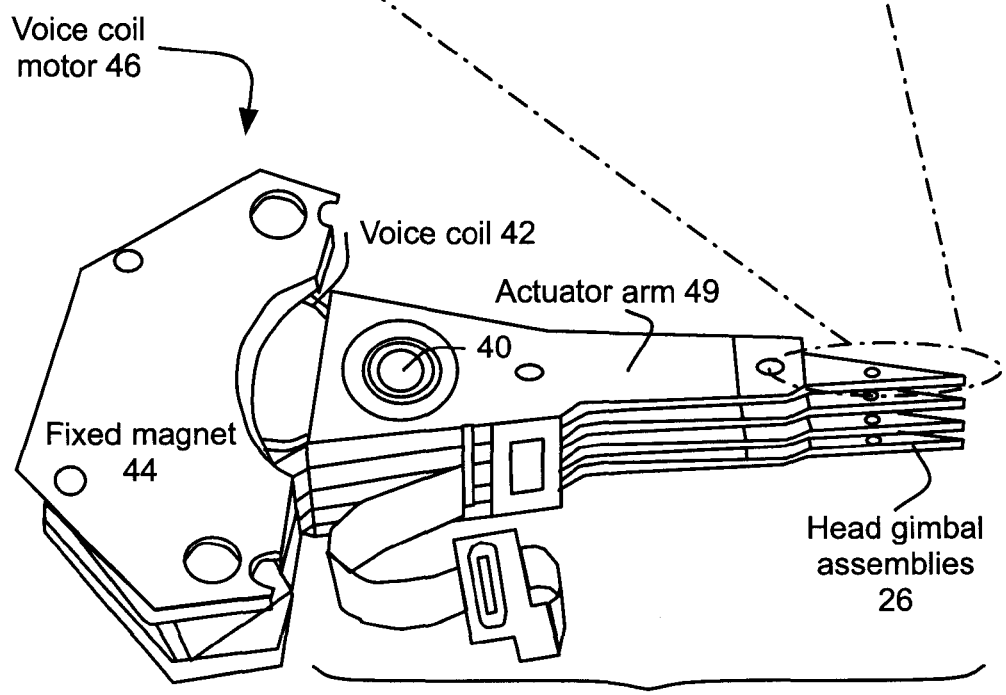
FIG. 2A shows a perspective view of the voice coil motor, its head stack assembly and the one or more head gimbal assemblies coupled to the one or more actuator arms of FIG. 1.

FIG. 2A shows a perspective view of the voice coil motor 45, its head stack assembly 48 and the one or more head gimbal assemblies 28 coupled to the one or more actuator arms 49. The head stack assembly is configured to pivot about the actuator pivot 40.

FIG. 2B shows a side view of some details of a head gimbal assembly 26 of the previous Figures, in particular, a flexure finger 27 coupled to the slider 20 may also include a resistive heater 24 and/or a micro-actuator to refine the position of the slider near the track 15 shown in FIG. 1. The micro-actuator may employ an electrostatic effect, a piezoelectric effect and/or a thermal mechanical effect to position the slider and may further be used to create an estimate of the mechanical strain induced on the slider when it contacts the rotating disk surface 6. The slider may use a perpendicular or longitudinal recording approach to accessing data on the rotating disk surface and may employ a magneto-resistive effect or a tunneling effect to read the data.

Figure 3:
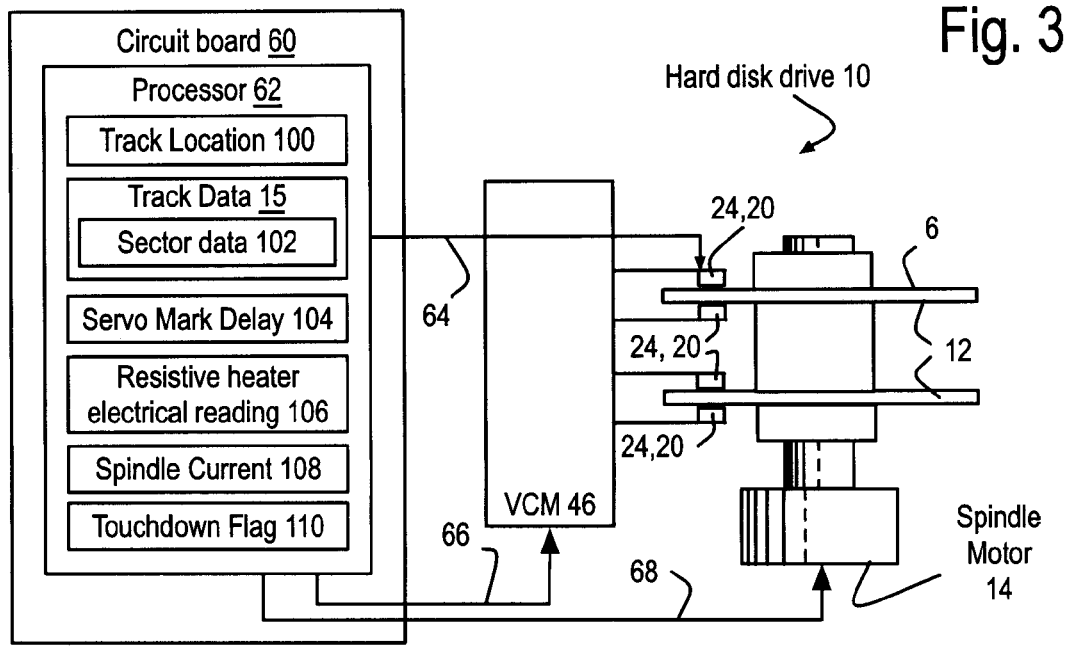
FIG. 3 shows a simplified electrical schematic of the hard disk drive of FIG. 1 where the circuit board includes a processor configured for electrical connection across the voice coil motor to a micro-actuator to alter the position of the slider over the track on the rotating disk surface. The processor may be configured to stimulate the voice coil motor to position the slider near the track. The processor may use a resistive heater electrical reading of the resistive heater to determine the slider's contact with the rotating disk surface. The track being accessed is at a track location with the track data including the sector data for at least one and often all of the sectors of the track. The processor may further stimulate the spindle motor to rotate the disks of the hard disk drive to create the rotating disk surfaces and receive an estimate of the spindle current consumed by the spindle motor. The processor may assert the touchdown flag in response to timing variations in the servo address marks found in the sector data, which will be further discussed in FIG. 4.

FIG. 3 shows a simplified electrical schematic of the hard disk drive 10 of FIG. 1 where the circuit board 60 includes a processor 62 configured for electrical connection 64 across the voice coil motor 46 to the micro-actuator to alter the position of the slider 20 over the track 15 on the rotating disk surface 6. The processor may be configured to stimulate 66 the voice coil motor to position the slider near the track. The processor may use a resistive heater electrical reading 106 of the resistive heater 24 to determine if the slider is in contact with the rotating disk surface. The track being accessed is at a track location 100 with the track data 15 including the sector data 102 for at least one and often all of the sectors of the track. The processor may further stimulate 68 the spindle motor 14 to rotate the disks 12 of the hard disk drive to create the rotating disk surfaces and receive an estimate of the spindle current 108 consumed by the spindle motor. The processor may assert the touchdown flag 110 in response to timing variations in the servo address marks found in the sector data, which will be further discussed in FIG. 4.

Figure 4:
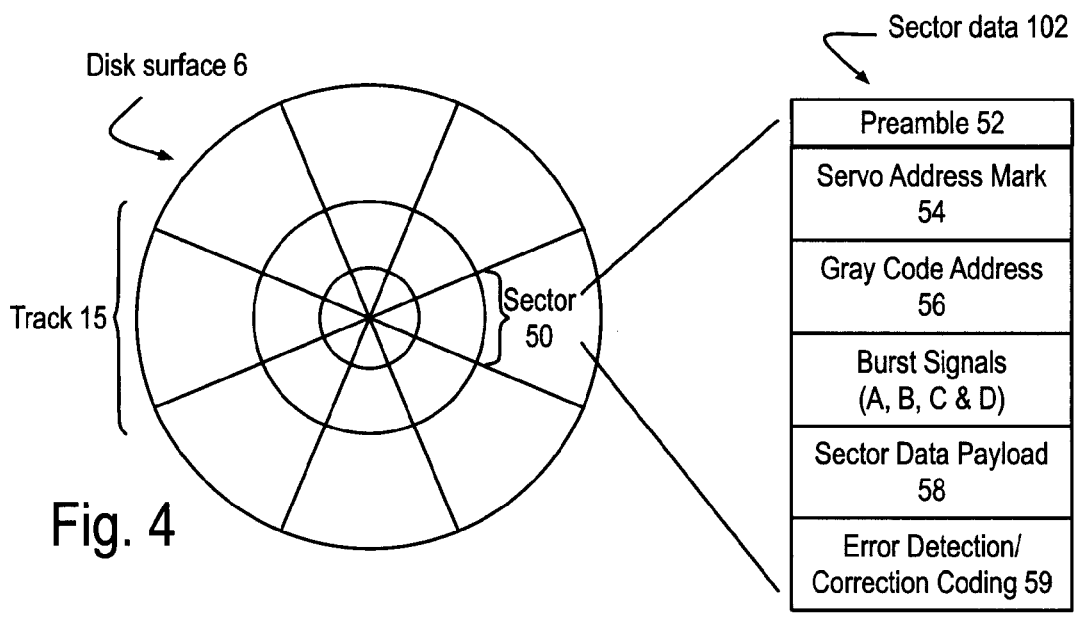
FIG. 4 shows a simplified example of the disk surface with multiple sectors per track, with each of the sectors having sector data that may include a preamble, a servo address mark, a gray code address, the burst signals often referred to as A, B, C and D, a sector data payload and an error detection/correction coding component. Various embodiments of the invention will use the variations or jitter in the time it takes to receive the servo address mark to estimate when the slider has contacted the rotating disk surface and asserting the touchdown flag in response to that condition.

FIG. 4 shows a simplified example of the disk surface 6 with multiple sectors 50 per track 15, with each of the sectors having the sector data 102 that may include a preamble 52, a servo address mark 54, a gray code address 56, the burst signals often referred to as A, B, C and D, a sector data payload 58 and an error detection/correction coding component 59. Various embodiments of the invention will use the variations or jitter in the time it takes to receive the servo address mark to estimate when the slider 20 has contacted the rotating disk surface 6 and asserting the touchdown flag 110 in response to that condition.

Figure 5:
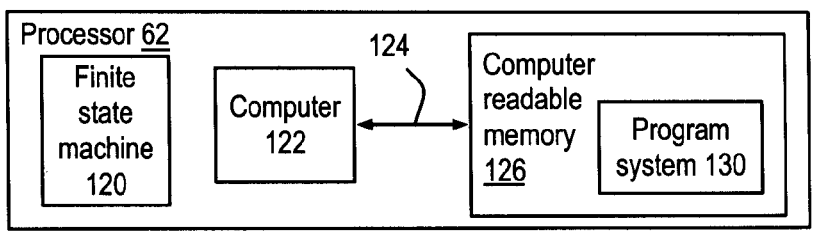
FIG. 5 shows a simplified block diagram of the processor including at least one instance of a finite state machine and/or a computer accessibly coupled via a buss to a computer readable memory containing a program system for instructing the computer to at least partly implement an embodiment of the invention's method. As used herein, the processor may or may not be included in the circuit board of FIGS. 1 and 3. For instance, during the manufacture of the hard disk drive, the processor and the computer readable memory may not be included in the hard disk drive.

FIG. 5 shows a simplified block diagram of the processor 62 including at least one instance of a finite state machine 120 and/or a computer 122 accessibly coupled 124 via a buss to a computer readable memory 126 containing a program system 130 for instructing the computer to at least partly implement an embodiment of the invention's method. As used herein, the processor may or may not be included in the circuit board 60 of FIGS. 1 and 3. For instance, during the manufacture of the hard disk drive, the processor and the computer readable memory may not be included in the hard disk drive.

As used herein a finite state machine receives at least one input and generates at least one output and may update and/or maintain at least one state, with at least one of the outputs being generated based upon the value of at least one of the inputs and/or the value of at least one of the states.

As used herein, a computer may include at least one data processor and at least one instruction, with each of the data processors being instructed by at least one of the instruction processors and at least one of the instruction processors are instructed by at least one program step of the program system 130 in accord with at least one of the invention's methods. The computer readable memory may or may not include a non-volatile memory that can retain its memory contents without an external supply of power.

FIG. 6A shows a schematic of the bias force shown as arrows exerted due to the slider 20 contacting the rotating disk surface 6. FIG. 6B shows the relative strength of the bias force measured by resistive heater electrical 106 as the vertical axis acting on the slider when it contacts the rotating disk surface at a track location 100 shown in the horizontal axis. The bias force will be toward the Middle Diameter (MD), which means that there may be essentially no bias force generated when the slider contacts the rotating disk surface near the Middle Diameter, whereas there may a measurable amount of bias force acting on the slider farther from the MD. The resistive heaters 24 may be included and/or coupled to the slider, which may be used to measure this bias force, leading to readings similar to those shown in FIG. 6B.

FIG. 7A shows a schematic of the friction on the slider 20 contacting the rotating disk surface 6 with the friction shown as arrows. FIG. 6B shows the relative strength of the friction measured by the servo address mark delay 104 as the vertical axis acting on the slider when it contacts the rotating disk surface at the track location 100 shown in the horizontal axis. The bias force will be directed away from the direction of motion and will be experienced as torque, which means that the torque will be minimal at the Inside Diameter (ID) and maximal at the Outside Diameter (OD). Previous approaches to measuring this torque used readings of the spindle current, which has problems, most importantly being the relatively low bandwidth resulting from needing to take at least three readings over the time it takes for three revolutions. By measuring the delay in the servo address mark for each sector in a track, this approach is as much faster as there are sectors in a track. For example a track with 240 sectors would have a bandwidth 240 times greater than the approach measuring the spindle current.

As used herein, starting a flowchart may include remembering at least part the states of the finite state machine 120, and/or at least part of the state of the computer 122, possibly by pushing a return state. The program steps may be implemented by states and/or state transitions in the finite state machine and/or as threads or tasks executed as program instructions by the computer. The exiting of the flowchart may include returning at least part of the state of the finite state machine and/or the computer, which may effect a return from a subroutine call in some situations.

Figure 8:
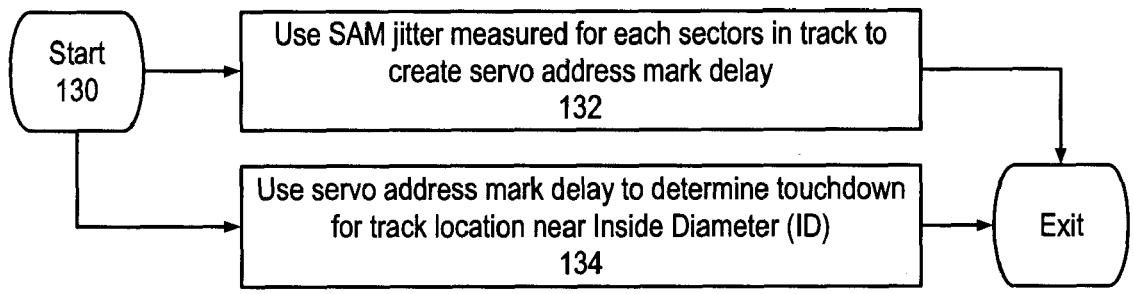
FIG. 8 shows a flowchart of the program system of FIG. 5 at least partly implementing the method by using the Servo Address Mark (SAM) jitter in the servo address mark delay for each sector in a track to create a servo address mark delay and using the servo address mark delay to determine when the slider contacts the rotating disk surface touchdown away from the Inside Diameter (ID). In some embodiments of the invention, this method may be sensitive enough to use on all tracks. Alternatively, the method may further use the resistive heater electrical reading for the track location near the Inside Diameter to determine the touchdown flag.

FIG. 8 shows a flowchart of the program system 130 of FIG. 5 at least partly implementing the method by using at least the first two program steps of this flowchart. Program step 132 supports using Servo Address Mark (SAM) jitter for each sector 50 in the track 15 to create a servo address mark delay 104. Program step 134 supports using the servo address mark delay 104 to determine when the slider contacts rotating disk surface, which is signified by the touchdown flag being asserted. This may be particularly useful for tracks away from the Inside Diameter (ID). In some embodiments of the invention, this method may be sensitive enough to use on all tracks. Alternatively, the program system and the method may further include program step 136 to use the resistive heater electrical reading 106 for the track location 100 near the Inside Diameter (ID) to determine the touchdown flag. The resistive heater electrical reading may be a voltage reading, a current reading or a resistive reading. In various embodiments of the invention, contact of the slider with the rotating disk surface may make the reading larger or smaller in a consistent fashion that may be used to determine such contact.

Figure 9:
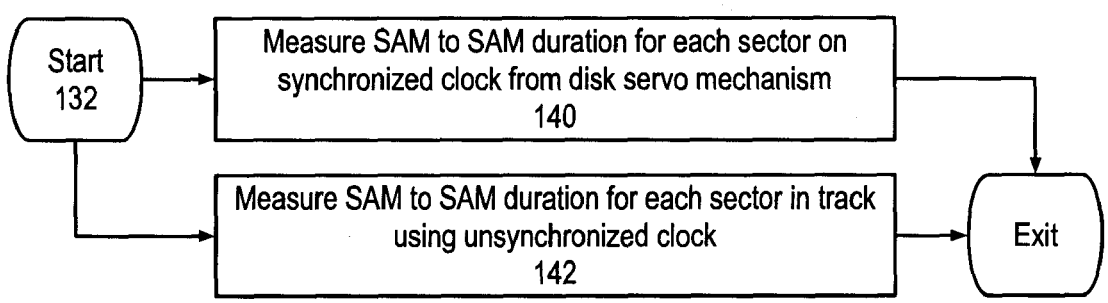
FIG. 9 shows a flowchart for two alternative approaches to using the servo address mark jitter, the first measures Servo Address Mark (SAM) to SAM duration on a synchronized clock from the disk servo mechanism, and the other measure that duration using a clock that is not synchronized to the disk servo mechanism.

FIG. 9 shows a flowchart for two alternative approaches as program steps to using the servo address mark jitter of program step 132. Program step 140 support measuring the Servo Address Mark (SAM) to SAM duration on a synchronized clock from the disk servo mechanism. And program step 142 supports measuring that duration using a clock that is not synchronized to the disk servo mechanism.

The hard disk drive 10 may be calibrated during manufacture and/or may further be recalibrated while in the field with this method. The calibrated hard disk drive is a product of this method. The method may be embodied as the program system 130 residing in the computer readable memory 126 for instructing a computer 122 included in the processor 62 of the hard disk drive, where the processor and/or the memory may or may not be included in the hard disk drive.

Normal operations of the hard disk drive include the following: When the hard disk drive 10 has been turned on and data is to be accessed in the hard disk drive, the processor 62 stimulates the spindle motor 14 to rotate the disks 12 to create the rotating disk surface 6. The processor stimulates the voice coil 42 in the voice coil motor 46 with a time-varying electrical signal, causing the voice coil to magnetically interact with the fixed magnetic assembly 44 of FIGS. 1 and 2A moving the head gimbal assembly 48 through the actuator pivot 42 to swing the head gimbal assemblies 26, to coarsely position their sliders 20 over the track 15 on the rotating disk surface, and the resistive heaters 24 may be further stimulated to refine that position.

Once the slider 20 is in position, when a write operation is to be performed the data 15 is written through the slider onto the rotating disk surface 6. When a read operation is to be performed, the slider is used to read the data in the track from the rotating disk surface as shown in FIG. 1 into the processor 62 as shown in FIG. 3. Often a Position Error Signal (PES) is derived from the read head of the slider to provide feedback to the processor 62 on the slider positioning over the rotating disk surface. from shortly before the start of one of these access operations, the resistive heater may be stimulated to alter the flying height 28 of the slider over the rotating disk surface.

The preceding embodiments provide examples of the invention, and are not meant to constrain the scope of the following claims.

What is claimed is:

1. A hard disk drive, comprising:
a disk base;
a spindle motor mounted on said disk base and coupled to at least one disk to create at least one rotating disk surface containing at least one track with multiple sectors each including a servo address mark;
a voice coil motor pivotably mounted to said disk base to position via a head gimbal assembly to at least one slider near said track on said rotating disk surface; and
a processor receiving said servo address marks to create a servo address mark delay used to create a touchdown flag in response to said servo address mark delay increasing due to said slider contacting said rotating disk surface;
wherein said processor creates said touchdown flag in response to said servo address mark delay increasing and in response to said track having a track location away from an Inside Diameter of said rotating disk surface; and
wherein said processor receives a resistive heater electrical reading from at least one resistive heater coupled to said slider that is used to create said touchdown flag in response to said track location being near said Inside Diameter of said rotating disk surface and in response to an electrical reading of said resistive heater increasing when said slider contacts said rotating disk surface.

2. The hard disk drive of claim 1, wherein said processor includes at least one instance of at least one member of the group consisting of a finite state machine and a computer accessibly coupled to a computer readable memory containing a program system including at least one program step to instruct said computer.

3. The hard disk drive of claim 2, wherein said hard disk drive further comprises a circuit board including said processor.

4. The hard disk drive of claim 1, further comprising:
a computer readable memory having a program system instruction configured to be accessibly coupled to said processor directing operations of said hard drive; and
wherein:
said program system instruction includes at least one program step to receive slider data of said track to create said servo address mark delay to determine said touchdown flag in response to said servo address mark delay increases from said slider contacting said rotating disk surface.

5. The hard disk drive of claim 4, wherein said processor uses said program step to further delay servo address mark in response to said track having a location away from another track at said Inside Diameter.

6. The hard disk drive of claim 5, wherein said program step uses said resistive heater electrical reading received from at least one of said resistive heater coupled to said slider in response to said track location near the another track at said Inside Diameter and increases of said resistive heater electrical reading when said slider contacts said rotating disk surface.

7. A method comprising the step of
operating a hard disk drive through a slider to access a track on a rotating disk surface to create a touchdown flag to indicate said slider has contacted said rotating disk surface, with said track including a servo address mark in each of at least two sectors,
wherein the step operating said hard disk drive further comprising the steps of:
rotating at least one disk by a spindle motor mounted on a disk base to create said rotating disk surface containing said track;
positioning said slider by at least a voice coil motor pivoting a head gimbal assembly near said track;
receiving by a processor from said slider data of said track to create a servo address mark delay;
using by said processor said servo address mark delay to determine said touchdown flag in response to said servo address mark delay increasing from said slider contacting said rotating disk surface, further comprising the step of using said servo address mark in response to said track having a track location away from an Inside Diameter of said rotating disk surface; and
using by said processor a resistive heater electrical reading received from at least one resistive heater coupled to said slider to determine said touchdown flag in response to said track location away from said Inside Diameter of said rotating disk surface and in response to said resistive heater electrical reading increasing when said slider contacts said rotating disk surface.

* * * * *